(12) United States Patent
Wojtowicz et al.

(10) Patent No.: US 10,724,385 B2
(45) Date of Patent: Jul. 28, 2020

(54) INSTALLATION OR REMOVAL OF TURBINE BLADE AT TURBINE BLADE BASE

(71) Applicant: General Electric Company, Schenectady, NY (US)

(72) Inventors: Hubert Karol Wojtowicz, Warsaw (PL); Adrian Adam Klejc, Warsaw (PL); Sandra Beverly Kolvick, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 15/806,479

(22) Filed: Nov. 8, 2017

(65) Prior Publication Data

US 2018/0142560 A1    May 24, 2018

(30) Foreign Application Priority Data

Nov. 23, 2016   (EP) .................................... 16461573

(51) Int. Cl.
*B23P 19/00*   (2006.01)
*F01D 5/30*   (2006.01)
(Continued)

(52) U.S. Cl.
CPC ............ *F01D 5/3007* (2013.01); *B23P 19/02* (2013.01); *F01D 5/225* (2013.01); *F01D 25/285* (2013.01); *F01D 5/005* (2013.01); *F05D 2230/60* (2013.01); *F05D 2230/68* (2013.01); *F05D 2230/70* (2013.01); *F05D 2240/30* (2013.01)

(58) Field of Classification Search
CPC ........... B23P 19/00; B23P 19/02; B23P 19/04; B23P 19/10; B23P 23/00
See application file for complete search history.

(56) References Cited

U.S. PATENT DOCUMENTS 2,949,909 A    8/1960   Macchioni et al.
3,146,835 A    9/1964   Hornstein
(Continued)

FOREIGN PATENT DOCUMENTS

DE    103 44 098 A1    4/2005
EP    1 614 856 A1    1/2006
(Continued)

OTHER PUBLICATIONS

Extended European Search Report and Opinion issued in connection with corresponding EP Application No. 16461573.4 dated May 11, 2017.

*Primary Examiner* — Lee D Wilson
(74) *Attorney, Agent, or Firm* — Armstrong Teasdale LLP

(57) ABSTRACT

Embodiments of the present disclosure relate to the installation or removal of turbine blades at a turbine blade base thereof. An apparatus according to the present disclosure can include: an operative head configured to engage an axial sidewall of a turbine blade base; and a mount removably coupled to a portion of a turbomachine assembly by a coupler, wherein the operative head is slidably coupled to the mount such that the operative head selectively engages the axial sidewall of the turbine blade base, and wherein the operative head is shaped to impart an axial and a circumferential force against the turbine blade base.

18 Claims, 13 Drawing Sheets

(51) Int. Cl.
*F01D 25/28* (2006.01)
*B23P 19/02* (2006.01)
*F01D 5/22* (2006.01)
*F01D 5/00* (2006.01)

(56) References Cited

U.S. PATENT DOCUMENTS

| | | | |
|---|---|---|---|
| 3,450,215 A | 6/1969 | Emery | |
| 3,550,694 A | 12/1970 | Gawlik et al. | |
| 4,033,419 A | 7/1977 | Pennington | |
| 4,763,394 A * | 8/1988 | Decato | B23P 19/02 |
| | | | 29/252 |
| 5,067,231 A * | 11/1991 | Ueno | B23P 19/02 |
| | | | 29/252 |
| 5,860,203 A * | 1/1999 | Gehr, Jr. | B23P 19/025 |
| | | | 29/252 |
| 6,267,553 B1 | 7/2001 | Burge | |
| 6,832,428 B2 | 12/2004 | Miura et al. | |
| 7,544,035 B1 * | 6/2009 | Friedrich | B66F 19/005 |
| | | | 414/684.3 |
| 7,934,302 B2 * | 5/2011 | Kalmar | F01D 25/285 |
| | | | 29/281.1 |
| 8,381,379 B2 * | 2/2013 | Holmes | B23P 19/04 |
| | | | 29/254 |
| 2002/0085917 A1 | 7/2002 | Roberst et al. | |
| 2015/0128417 A1 | 5/2015 | Laborde | |
| 2015/0218948 A1 * | 8/2015 | Bird | F01D 5/005 |
| | | | 29/889.1 |
| 2018/0126502 A1 * | 5/2018 | Wojtowicz | F01D 25/285 |
| 2018/0142560 A1 * | 5/2018 | Wojtowicz | F01D 5/225 |

FOREIGN PATENT DOCUMENTS

| | | |
|---|---|---|
| EP | 2 944 760 A1 | 11/2015 |
| WO | 2005/054631 A1 | 6/2005 |
| WO | 2012/167824 A1 | 12/2012 |

* cited by examiner

INSTALLATION OR REMOVAL OF TURBINE BLADE AT TURBINE BLADE BASE

BACKGROUND

The present disclosure relates generally to the installation or removal of turbine blades in turbomachine assemblies, and more particularly, to an apparatus and method for installing and removing turbine blades at a turbine blade base.

Rotors for turbomachines such as turbines are often machined from large forgings. Rotor wheels cut from the forgings are typically slotted to accept the bases of turbine blades for mounting. As the demand for greater turbine output and more efficient turbine performance continues to increase, larger and more articulated turbine blades are being installed in turbomachines. Latter stage turbine blades are one example in a turbine where blades are exposed to a wide range of flows, loads and strong dynamic forces. Consequently, optimizing the performance of these latter stage turbine blades in order to reduce aerodynamic losses and to improve the thermodynamic performance of the turbine can be a technical challenge.

Dynamic properties that affect the design of these latter stage turbine blades include the contour and exterior surface profile of the various blades used in a turbomachine assembly, which may affect the fluid velocity profile and/or other characteristics of operative fluids in a system. In addition to the contour of the blades, other properties such as the active length of the blades, the pitch diameter of the blades and the high operating speed of the blades in both supersonic and subsonic flow regions can significantly affect performance of a system. Damping and blade fatigue are other properties that have a role in the mechanical design of the blades and their profiles. These mechanical and dynamic response properties of the blades, as well as others, such as aero-thermodynamic properties or material selection, all influence the relationship between performance and surface profile of the turbine blades. Consequently, the profile of the latter stage turbine blades often includes a complex blade geometry for improving performance while minimizing losses over a wide range of operating conditions.

The application of complex blade geometries to turbine blades, particularly latter stage turbine blades, presents certain challenges in assembling these blades on a rotor wheel. For example, adjacent turbine blades on a rotor wheel are typically connected together by cover bands or shroud bands positioned around the outer periphery of the blades to confine a working fluid within a well-defined path and to increase the rigidity of the blades. These interlocking shrouds may impede the direct assembly and disassembly of blades positioned on the rotor wheel. In addition, inner platforms of these blades may include tied-in edges, which also can impede their assembly on the rotor wheel.

SUMMARY

A first aspect of the present disclosure provides an apparatus for installation or removal of a turbine blade, the apparatus including: an operative head configured to engage an axial sidewall of a turbine blade base; and a mount removably coupled to a portion of a turbomachine assembly by a coupler, wherein the operative head is slidably coupled to the mount such that the operative selectively engages the axial sidewall of the turbine blade base, and wherein the operative head is shaped to impart an axial and a circumferential force against the turbine blade base.

A second aspect of the present disclosure provides an apparatus for installation or removal of a turbine blade at a turbine blade base thereof, the apparatus including: an operative head configured to engage an axial sidewall of the turbine blade base, wherein the operative head is shaped to impart an axial and a circumferential force against the turbine blade base; an actuator configured to move the operative head into and out of engagement with the axial sidewall of the turbine blade base; and a mount removably coupled to a portion of a turbomachine assembly by a coupler, wherein the actuator is slidably coupled to an exterior surface of the mount.

A third aspect of the present disclosure provides a method for installation or removal of a turbine blade, the method including: fastening a mount of a servicing apparatus to a portion of a turbomachine assembly, such that an operative head of the servicing apparatus is substantially axially aligned with a turbine blade base of a turbine blade, and engages an axial sidewall of the turbine blade base, and wherein the operative head of the servicing apparatus is shaped to impart an axial and a circumferential force against the turbine blade base; and mechanically actuating the turbine blade base relative to the turbomachine by applying the axial force and the circumferential force against the turbine blade base through the operative head, such that the turbine blade transfers into or out of a rotor wheel.

A fourth aspect of the present disclosure provides an apparatus for installation or removal of a turbine blade, the apparatus including: an operative head configured to engage an axial sidewall of a turbine blade base; and a mount removably coupled to a portion of a turbomachine casing by a coupler, wherein the operative head is slidably coupled to the mount such that the operative head of the vibrating assembly selectively engages the axial sidewall of the turbine blade base, and wherein the operative head is shaped to impart an axial and a circumferential force against the turbine blade base.

A fifth aspect of the present disclosure provides an apparatus for installation or removal of a turbine blade at a turbine blade base thereof, the apparatus including: a mount removably coupled to a turbomachine casing by a coupler, and including an axial guide thereon; an arm slidably coupled to the mount through the axial guide, wherein the arm includes a first end coupled to the axial guide of the mount and an opposing second end; an actuator configured to adjust a position of the arm along the axial guide; and an operative head coupled to the opposing second end of the arm, and configured to contact an axial sidewall of the turbine blade base, wherein the operative head is shaped to impart an axial and a circumferential force against the turbine blade base.

A sixth aspect of the present disclosure provides a method for installation or removal of turbine blades, the method including: fastening a mount including a servicing apparatus to a casing of a turbomachine assembly; rotating a rotor wheel of the turbomachine assembly about a centerline axis thereof, such that an operative head of the servicing apparatus is substantially axially aligned with a turbine blade base of a selected turbine blade; engaging the operative head of the servicing apparatus with an axial sidewall of the turbine blade base; and mechanically actuating the turbine blade base relative to the turbomachine by applying an axial force and a circumferential force against the turbine blade base through the operative head, such that the turbine blade transfers into or out of the rotor wheel.

DETAILED DESCRIPTION

Spatially relative terms, such as "inner," "outer," "beneath," "below," "lower," "above," "upper," "inlet," "outlet," and the like, may be used herein for\ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As denoted in these Figures, the "A" axis represents axial orientation (along the axis of a rotor of a turbomachine assembly). As used herein, the terms "axial" and/or "axially" refer to the relative position/direction of objects along axis A, which is substantially parallel with the axis of rotation of the turbomachine assembly (in particular, the rotor section thereof). As further used herein, the terms "radial" and/or "radially" refer to the relative position/direction of objects along axis (R), which is substantially perpendicular with axis A and intersects axis A at only one location. Additionally, the terms "circumferential" and/or "circumferentially" refer to the relative position/direction of objects along a circumference (C) which surrounds axis A but does not intersect the axis A at any location. In figures which depict a two-dimensional view, circumference C may be omitted for clarity. Identically labeled elements in the Figures depict substantially similar (e.g., identical) components. In addition, the term "transfer" or "axial transfer" refers to the process of moving (e.g., by sliding motion) a component such as a blade from one position to another, such to or from a dovetail slot of a rotor wheel. Thus, embodiments of the present disclosure discussed herein can allow turbine blades to be installed within or removed from a turbomachine assembly by transferring one or more turbine blades. Although installation of turbine blades is shown more specifically in FIGS. 7 and 11, with other FIGS. demonstrating removal of turbine blades. However, it is understood that the various embodiments described herein may be operable to install or remove turbine blades at a rotor wheel without modifying the various components and/or process methodologies discussed. Embodiments of the present disclosure also provide methods of installing turbine blades by using various apparatuses discussed herein and/or similar assemblies.

Figure 1:
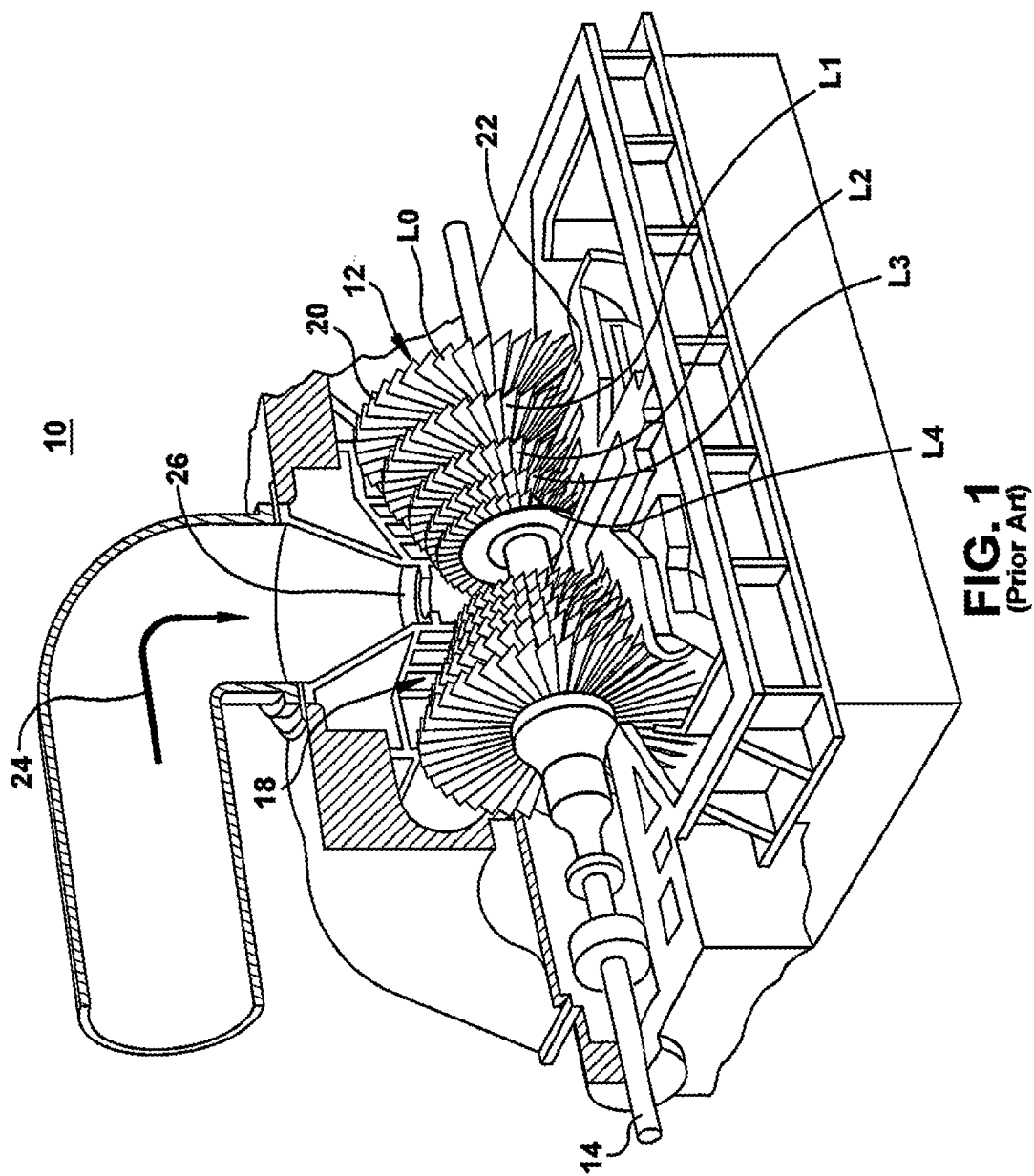
FIG. 1 is a schematic view of a conventional turbomachine assembly.

Referring to the drawings, FIG. 1 shows a perspective partial cut-away illustration of a turbomachine assembly ("turbomachine") 10 in the form of a steam turbine section. Embodiments of the present disclosure include an apparatus for installing and removing rotatable blades of machines such as turbomachine 10, e.g., steam turbines, gas turbines or other turbine assemblies. Apparatuses and systems according to the present disclosure can be operable to install or remove turbine blades where conventional devices may not be usable or practical. Embodiments of the present disclosure may also be capable of installing or removing turbine blades which cannot be installed or removed solely by the application of mechanical force in one direction. To better illustrate features of the present disclosure during operation, example characteristics turbomachine 10 are discussed. Turbomachine 10 includes a rotor 12 that includes a shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extend circumferentially around shaft 14 and are axially positioned between adjacent rows of blades 20. Stationary vanes 22 cooperate with blades 20 to form a turbine stage and define a portion of a flow path through turbomachine 10.

In operation, operative fluid 24 enters an inlet 26 of turbomachine 10 and is channeled through stationary vanes 22. Operative fluid 24 may take the form of, e.g., steam in the example of a steam turbine, hot combusted gases in gas turbines, and/or other fluids in different types of turbomachinery. Turbomachine 10 thus can extract mechanical power from operative fluid 24 after combustion. Vanes 22 direct fluid 24 downstream against blades 20. Fluid 24 passes through the remaining stages imparting a force on blades 20 causing shaft 14 to rotate. At least one end of turbomachine 10 may extend axially away from rotor 12 and may be attached to a load or machinery (not shown) such as, but not limited to, a generator, and/or another turbine. Accordingly, a large turbine unit may actually include several turbines each co-axially coupled to the same shaft 14. Such a unit may, for example, include a high pressure section coupled to an intermediate-pressure section, which in turn is coupled to a low pressure section.

In one embodiment of the present disclosure and shown in FIG. 1, turbomachine 10 can comprise five stages referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and a section of a turbine (e.g., a low pressure section), can have more or less than five stages. As noted herein, turbomachine 10 is shown in the form of a steam turbine in FIG. 1 but it is understood that embodiments of the present disclosure may be used with gas turbines, water turbines, wind turbines, etc.

Figure 2:
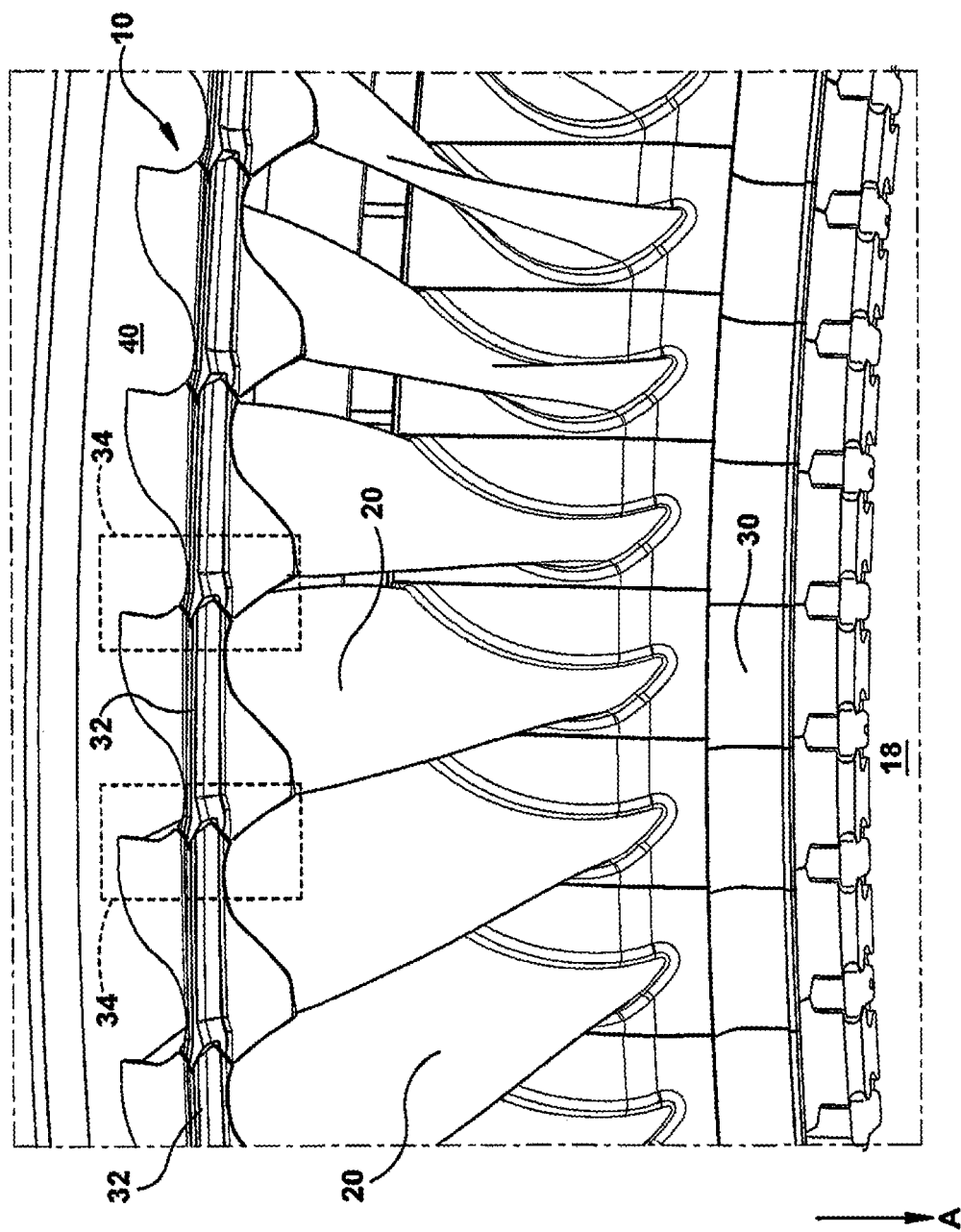
FIG. 2 is a perspective view of turbine blades coupled to a rotor wheel, and including an interlocking shroud interface.

Turning to FIG. 2, blades 20 are shown arranged in a row and mounted circumferentially adjacent to each other on rotor wheel 18. Blades 20 may be designed for continued circumferential engagement with each other during operation and when subjected to relatively high loads. An example form of mechanical engagement between circumferentially adjacent blades 20 is shown in FIG. 2, and embodiments of the present disclosure may be effective for installing and removing blades 20 designed for this arrangement or similar arrangements. Each blade 20 can be mechanically coupled to and mounted on rotor wheel 18 through a turbine blade base 30 including, e.g., a dovetail shape designed to fit within and engage a complementary slot within rotor wheel 18. As shown in FIG. 2, blades 20 can extend from blade base 30 with varying profiles and/or contours for accommodating a flow of fluid 24 (FIG. 1) or other fluids across each blade 20. A radial end of blade 20 can include a shroud portion 32 in the form of a mutually engaging, substantially identical block or plate formed and/or mounted on the tip of each blade 20. Once each blade 20 is installed on rotor wheel 18, the engaging blocks or plates of each shroud portion 32 can form a substantially continuous tip shroud element, e.g., a substantially continuous, annular body configured to direct a flow around rotor 12 (FIG. 1).

Figure 3:
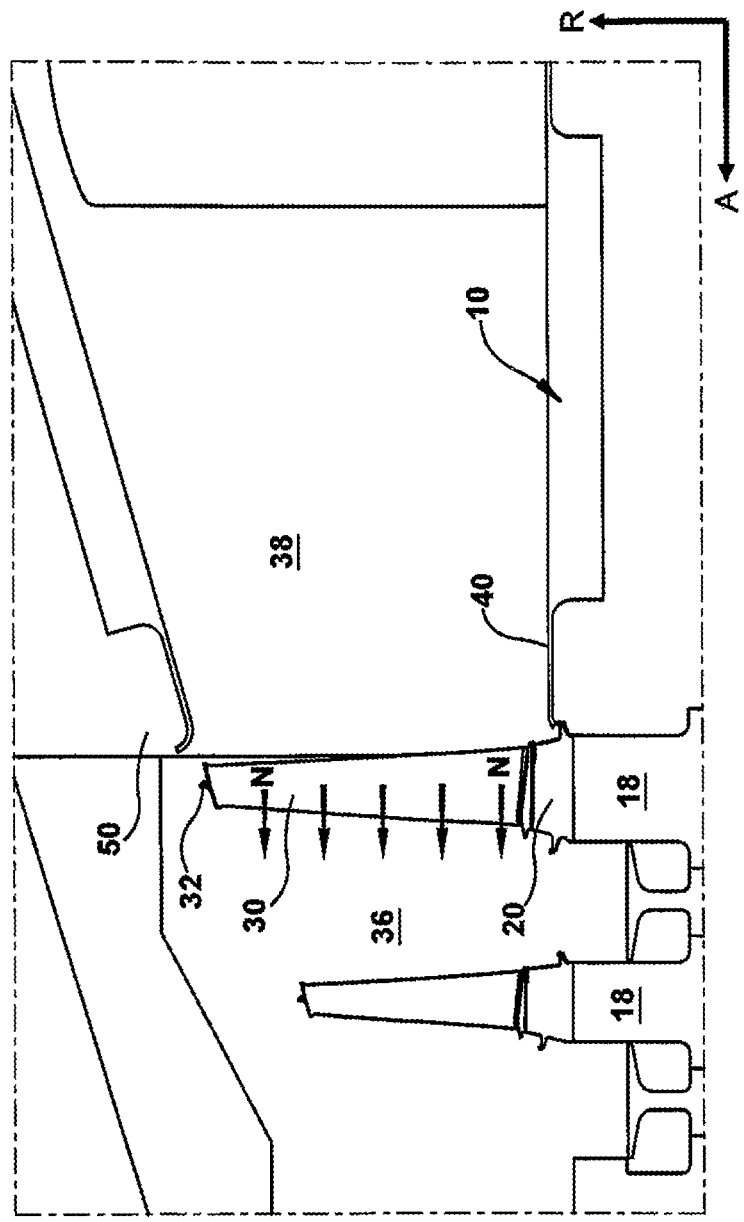
FIG. 3 is a cross-sectional view in plane A-R of a turbomachine assembly and turbine blade coupled to a portion of the assembly at a turbine blade base.

Referring to FIGS. 2 and 3 together, shroud portion 32 of each blade 20 can include, e.g., an interlocking profile 34 (FIG. 2 only) for circumferential engagement with shroud portions 32 of adjacent blades 20. In some examples, interlocking profile 34 may include a Z-shape, a V-shape, a zig-zag path with multiple transition points, a curvilinear surface, a complex geometry including straight-faced and curved surfaces, etc. However embodied, interlocking profile 34 can inhibit axial sliding of each blade 20 relative to rotor wheel 12 after each blade 20 has been installed. In addition, blades 20 may be positioned directly between a turbine region 36 of turbomachine 10 and an adjacent flow path 38, e.g., a diffusor section of turbomachine 10. For example, as shown in FIG. 3, each blade may be designed for installation or removal substantially along the direction of axial path N. Interlocking profile 34 can be advantageous during operation of turbomachine 10, e.g., by maintaining the relative position of each blade 20 relative to each other and to rotor wheel 18. However, interlocking profile 34 may reduce the ability for one or more blades 20 to be installed or removed from a location directly between two other blades 20 during manufacture or servicing.

Embodiments of the present disclosure can mitigate these properties of interlocking profile 34, e.g., by imparting an axially-oriented force to install and remove blades 20 while subjecting the installed or removed blade 20 to axial forces and circumferential forces. In some embodiments, the installed or removed blade 20 can further be subjected to mechanical vibrations. Such vibrations, e.g., can impart oscillating motion of blade 20 and allow axial movement of blade 20 despite the presence of interlocking profile 34. Various embodiments for imparting axial force, circumferential force, and/or mechanical vibration against blade(s) 20 are discussed herein. Embodiments of the present disclosure can include an apparatus mounted, e.g., on part of a diffusor barrel 40 (e.g., a panel or strut thereof) of turbomachine 10, a casing 50 of turbomachine 10, and/or other turbomachine components capable of having various structural features discussed herein mounted thereon.

Figure 4:
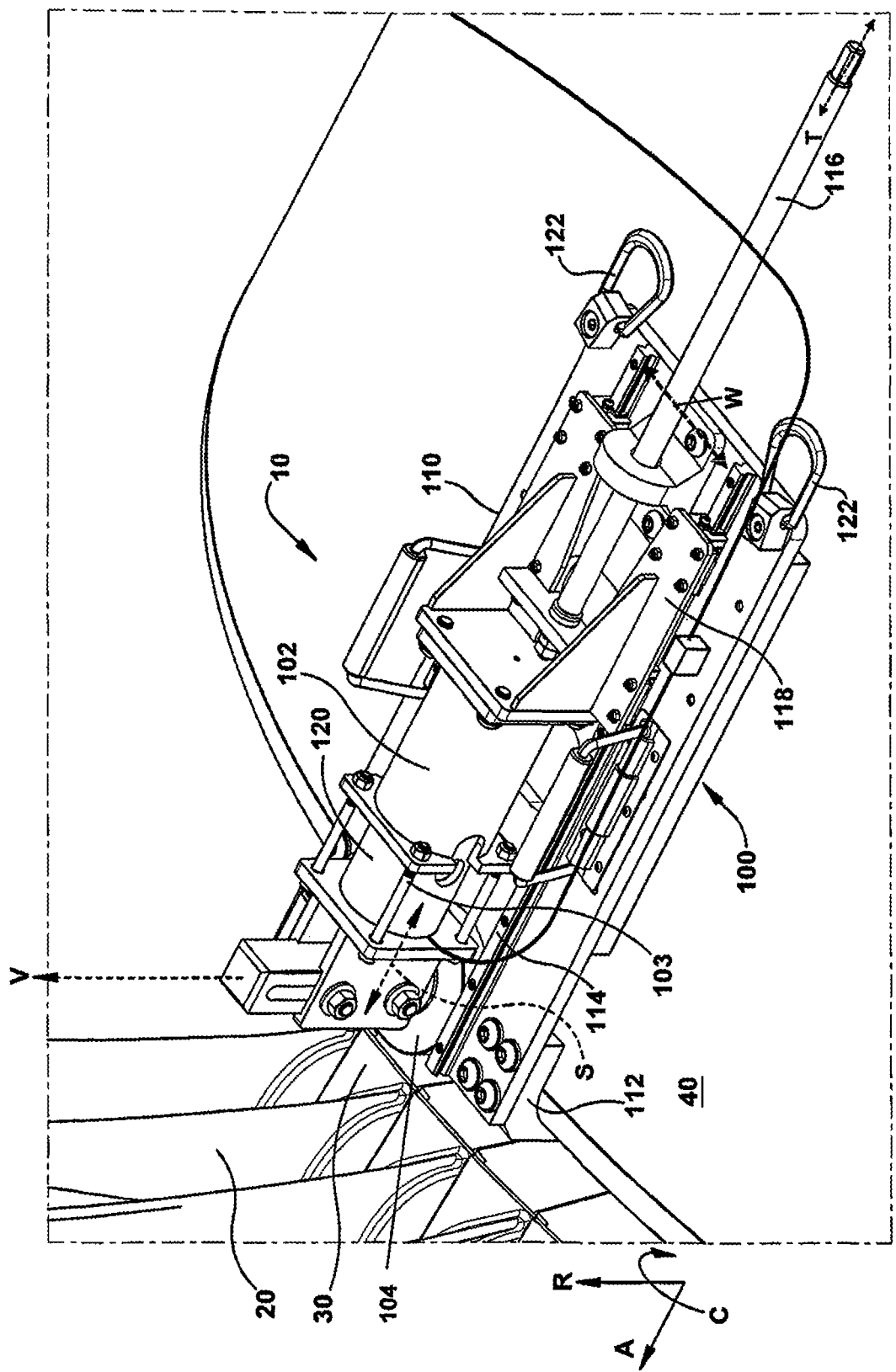
FIG. 4 is a perspective view of an apparatus for installing and removing a turbine blade according to embodiments of the present disclosure.
Figure 5:
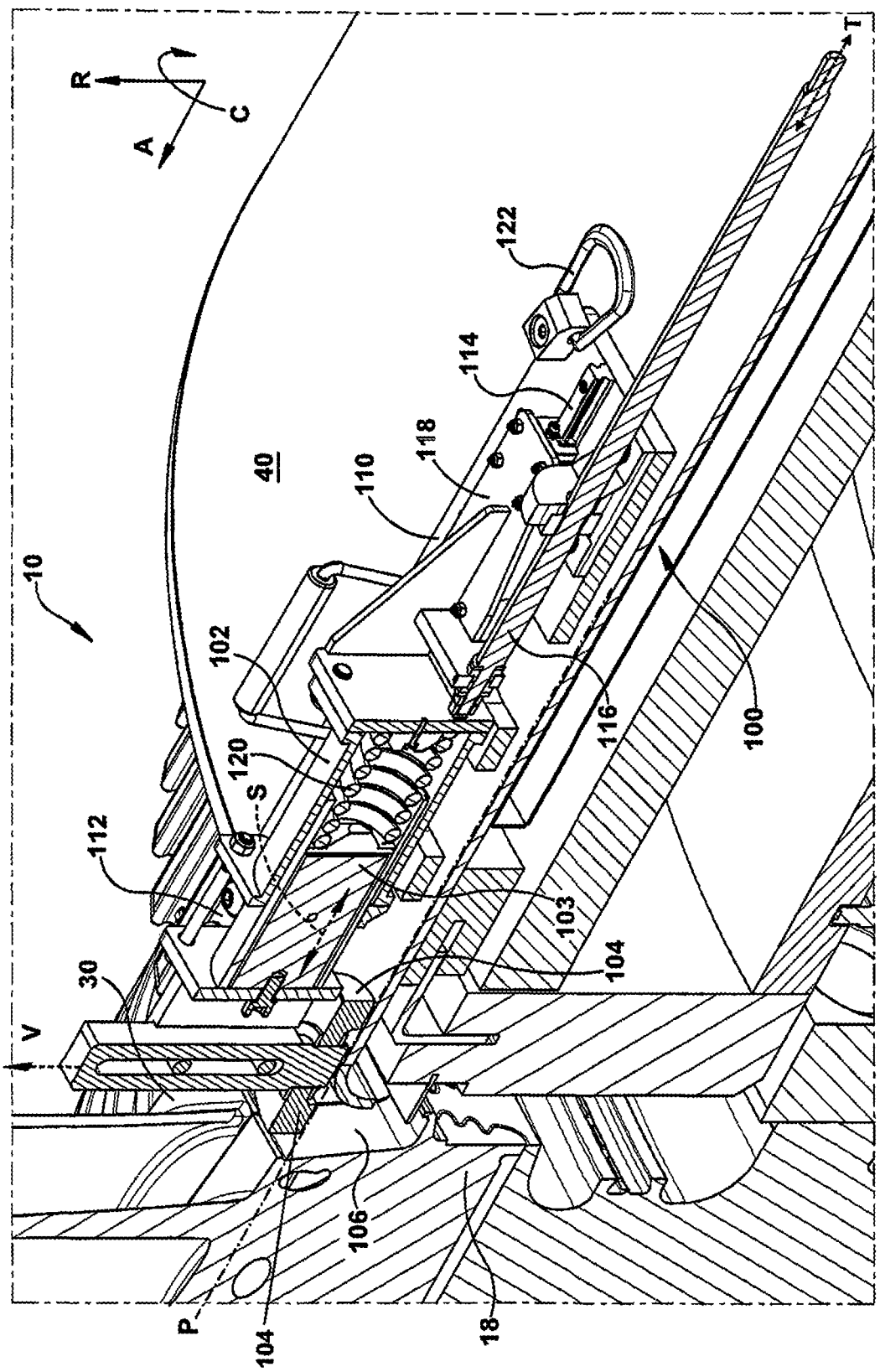
FIG. 5 is a cut-away perspective view of an apparatus for installing and removing a turbine blade according to an embodiment of the present disclosure.

Referring to FIGS. 4 and 5 together, a servicing apparatus 100 (simply "apparatus" hereafter) for installing and removing turbine blades 20 at turbine blade base 30 is shown according to embodiments of the present disclosure is shown. Turbine blade base 30 may include a root of turbine blade 20 or may include any portion of turbine blade 20 positioned proximal to rotor wheel 18. A cut-away view of apparatus 100 is shown in FIG. 5 to better illustrate internal components thereof. Blade(s) 20 depicted in the following FIGS. may include last-stage (e.g., L0 (FIG. 1)) blades in turbomachine 10, which may include the same or similar features shown in FIGS. 2-3 and described elsewhere herein. Last-stage blades 20 may differ from other blades 20 in turbomachine 10, e.g., by being positioned where conventional vibrating assemblies and/or actuating devices for installing and removing blades 20 cannot be used, or are impractical. Embodiments of apparatus 100, and other method or apparatus embodiments described herein, can be used to install or remove blade(s) 20 while being mechanically coupled to one or more portions of turbomachine 10.

In contrast to conventional installation or removal devices, which may require a user to remove portions of rotor 12, shaft 14, diffusor barrel 40, casing 50 and/or other major components of turbomachine 10 to access blades 20, embodiments of apparatus 100 can be sized for direct mounting on components of turbomachine 10 without these components being removed. Turbomachine 100 may include internal components for imparting mechanical vibrations and axial force against blade(s) 20, e.g., at turbine blade base 30. Apparatus 100 may include a vibrating assembly 102 which can further include a vibratory drive mechanism 103. In any event, apparatus 100 can include an operative head 104 shaped to impart axial and circumferential forces against turbine blade base 30. Operative head 104 can thus be shaped and/or positioned to engage an axial sidewall 106 of turbine blade base 30 while applying mechanical force thereto in multiple directions. In some implementations, vibratory drive mechanism 103 can include a pneumatic motor configured to generate mechanical vibrations and/or other forms of movement using compressed air fed to vibrating assembly 102, e.g., through a fluid source. Vibratory drive mechanism 103 can alternatively include, or be embodied as, an electric motor, combustion engine, and/or other currently-known or later developed instruments for producing mechanical work. Operative head 104 can be provided in the form of any currently-known or later-developed instrument for imparting vibrational oscillation against components mechanically engaged thereto. Operative head 104 can be embodied as, e.g., one or more vibrating hammers, plates, cylinders, rollers, etc. In the accompanying FIGS., operative head 104 is shown to be in the form of a substantially circular or oblong roller configured to rotate about an eccentric axis relative to turbomachine 10.

Apparatus 100 can also include a mount 110 coupled to a portion of turbomachine 10 (e.g., diffusor barrel 40), e.g., by a coupler 112, to position apparatus 100 at a desired location. Mount 110 can serve as a reference component or surface for adjusting and using vibrating assembly 102 and/or other components of apparatus 100 described herein. Vibrating assembly 102 can be adjustably coupled to and/or positioned directly on mount 110 through one or more axial guides 114 which may be embodied, e.g., as rails for slidable adjustment, or other currently-known or later-developed form of bearing including a raceway, threaded housing, gear bearing, rack-and-pinion, etc. In one example, axial guides 114 may be provided as a pair of rails positioned on mount 110 and spaced circumferentially relative to each other. In this case, a circumferential separation distance W (FIG. 4 only) between each axial guide rail 114 may be substantially equal to the circumferential length of one blade 20. Slidably coupling vibrating assembly 102 to mount 110 (e.g., through axial guide(s) 114) can allow vibrating assembly 102 to be selectively aligned with one or more blades 20 for engagement or disengagement with axial sidewall 106 of turbine blade base 30. For example, vibrating assembly 102 can move relative to mount 110 along the direction of arrow T through an actuator 116 as described elsewhere herein, Mount 110 can also include one or more features configured to mechanically couple apparatus 100 to portions of turbomachine 10, e.g., diffusor barrel 40. As noted herein, couplers 112 can physically couple apparatus 100 to portions of turbomachine 10 positioned in close proximity to blade(s) 20. Each coupler 112 may be embodied, e.g., in the form of a lift hook, claw, protrusion, and/or other mechanical instrument for engaging one or more portions of a turbomachine component such as diffusor barrel 40. In an embodiment, couplers 112 may extend radially, and may couple mount 110 to an axial sidewall E of diffuser barrel 40. Couplers 112 may alternatively include, e.g., sets of bolts or screws extending through mount 110 and coupler 112, and any currently-known or later developed fixed or adjustable mechanical coupling is contemplated. Each coupler 112 can extend substantially radially inward from mount 110 at axial sidewall E of diffuser barrel 40. In alternative embodiments, coupler(s) 112 may include platforms, rails, etc., configured for placement on the surface of diffusor barrel 40 such that mount 110 is positioned radially distal to the exterior of diffusor barrel 40.

Apparatus 100 may be configured to permit axial movement of vibrating assembly 102 relative to mount 110 such that blade(s) 20 can be selectively and temporarily engaged with operative head 20. During operation, apparatus 100 and portions thereof (e.g., operative head 104) can be configured for axial movement by including actuator 116 (e.g., a linear actuator and/or other device for instantiating movement of component(s) hi at least one direction) coupled to vibrating assembly 102. Actuator 116 may be embodied as a purely mechanical device and/or may be powered at least partially by vibratory drive mechanism 103 and/or other, independent drive mechanisms (not shown) configured to activate actuator 116 in a forward or reverse axial direction. To move vibrating assembly 102 relative to mount 110, a slidable coupling 118 can mechanically connect actuator 116 and/or vibrating assembly 102 to axial guide(s) 114 mount 110. Slidable coupling 118 can be in the form of, e.g., a trolley, gear, wheel, and/or other mechanical device for enabling movement of vibrating assembly 102 relative to axial guide 114 in the direction of arrow T, while inhibiting movement in other (e.g., radial and/or circumferential) directions.

During operation, apparatus 100 can be implemented in methods for installing and removing turbine blades 20. For instance, methods according to the disclosure can initially include fastening mount 110 to a portion of turbomachine 10, e.g., diffusor barrel 40, with couplers 112. At a selected position on diffusor barrel 40, operative head. 104 of apparatus 100 may be substantially axially aligned with turbine blade base 30 of turbine blade 20. An operator may move operative head 104 axially forward or backwards substantially along the direction of reference arrow S, e.g., with actuator 116. Axially moving operative head 104 while it operates can cause operative head 104 to selectively engage and disengage axial sidewall 106 of turbine blade base 30. In some cases, vibratory drive mechanism 103 of vibrating assembly 102 can cause operative head 104 to exert mechanical vibrations as operative head 104 contacts blade 20.

As operative head 104 axially engages turbine blade base 30 and inoarts axial and circumferential force against turbine blade base 30, blade 20 may be installed or removed axially regardless of shroud portion 32 (FIGS. 2-3) and/or interlocking profile 34 (FIG. 3). Applying both force and mechanical vibration to blade 20 through operative head 104, in some cases, can overcome mechanical resistance stemming from non-linear contact between circumferentially adjacent blades 20. In an example, applying vibrations through vibrating assembly 102 and/or moving operative head 104 with actuator 116 can transfer blade(s) 20 into or out of rotor wheel 18. These operational features of apparatus 100 can allow an operator to transfer blade(s) 20 which include shroud portion(s) 32 (FIGS. 2-3) which include interlocking profile 34 (FIG. 3) with adjacent blades 20. In addition, methods of using apparatus 100 can enable blades 20 to be installed or removed without disassembling diffusor barrel 40 or other components of turbomachine 10.

Figure 6:
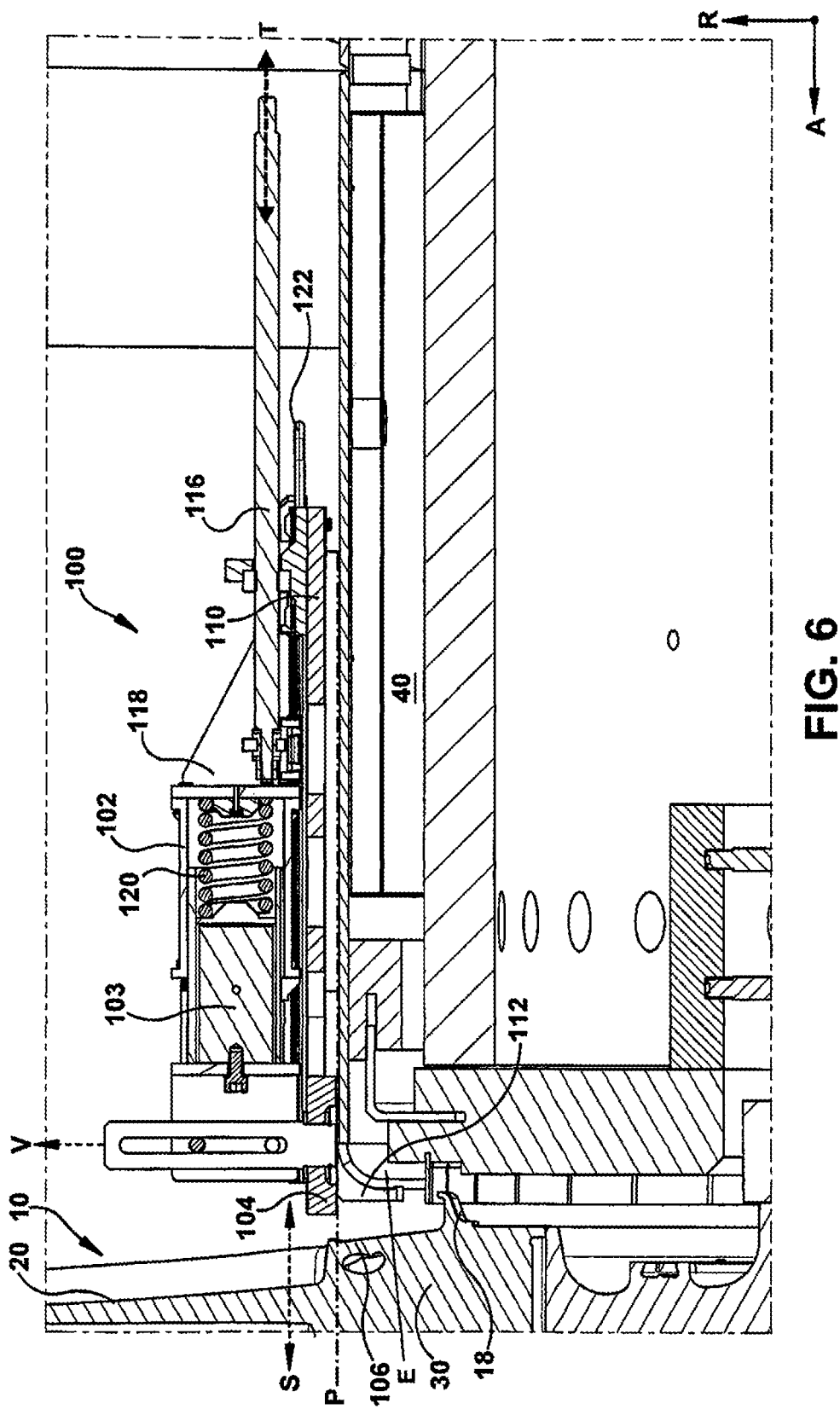
FIG. 6 is a cross-sectional view in plane A-R of an apparatus for installing and removing a turbine blade according to an embodiment of the present disclosure.

Apparatus 100 can optionally include features to enhance sliding movement of vibrating assembly 102 and engagement between operative head 104 and turbine blade base 30. Turning to FIGS. 5 and 6 together, embodiments of apparatus 100 can allow an operator to apply a vibration and an axial force against turbine blade base 30 in a predetermined direction and along a predetermined plane. For instance, an outer axial surface of diffusor barrel 40 may define or be coincident with a single axial plane P. Mount 110 may have an elongate profile shaped to complement the exterior of diffuser barrel 40, and extend along axial plane P. Vibrating assembly 102 may be shaped such that a portion of operative head 104 extends radially inward relative to other components of vibrating assembly 102. Where operative head 104 is provided in the form of a roller configured to rotate about eccentric axis V, operative head 104 can be shaped to rotate within axial plane P directly adjacent to diffusor barrel 40. Positioning mount 110 and operative head 104 along plane P of diffusor barrel 40 can reduce the risk of misalignment between apparatus 100 and blade 20, allow apparatus 100 to be more compact, and/or may offer additional advantages not specifically discussed.

Figure 7:
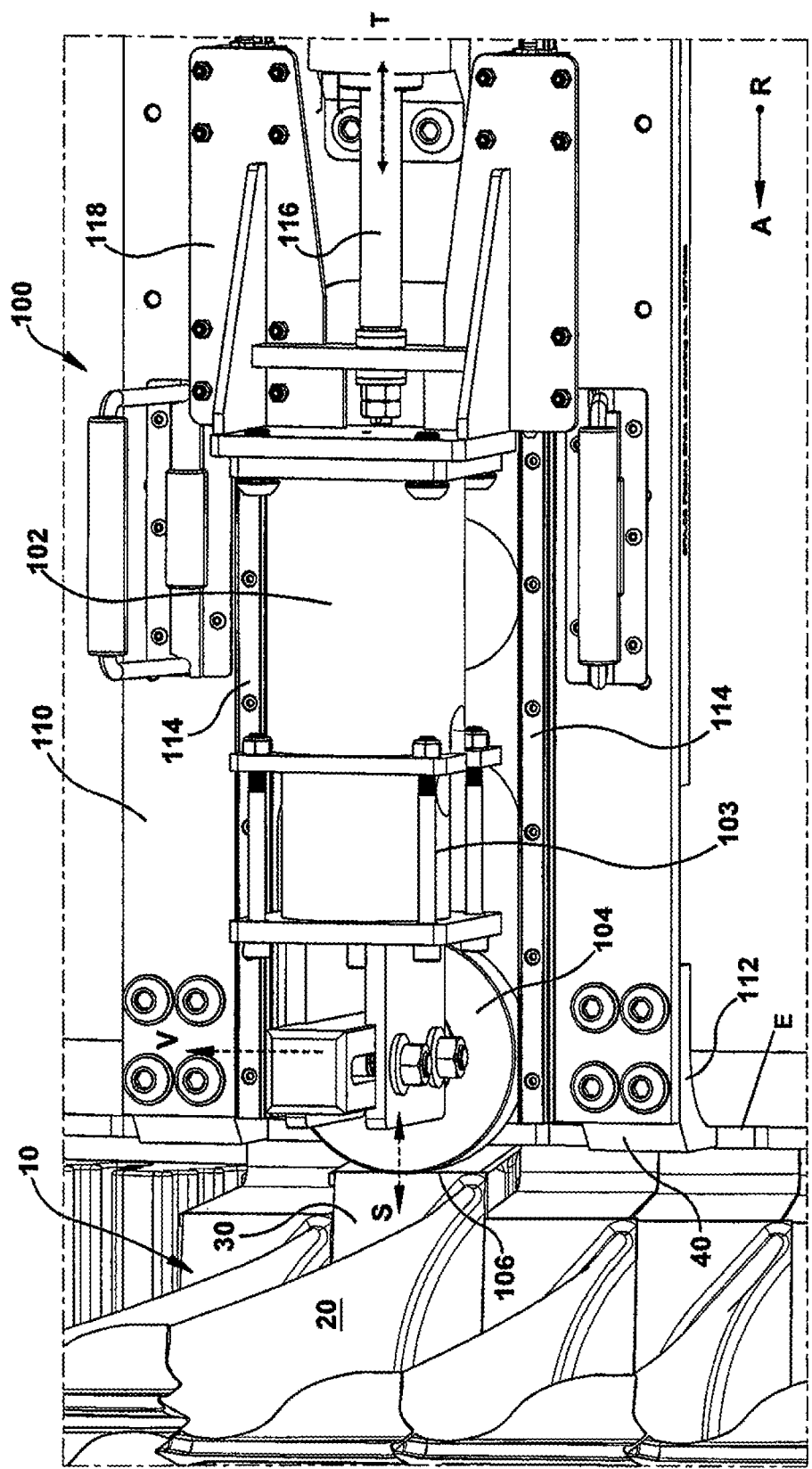
FIG. 7 is a top-down view, with radial axis R extending out of the page, of an apparatus for installing and removing a turbine blade according to an embodiment of the present disclosure.

Referring to FIGS. 6 and 7 together, vibrating assembly 102 may also include features for reducing the risk of mechanical wear on blades 20 from prolonged contact between operative head 104 and blade(s) 20, and/or easily moving operative head 104 into contact with successive blades 20. As noted herein, FIG. 7 also provides an example of blade(s) 20 being installed, rather than removed. Vibrating assembly 102 can include a spring 120 positioned axially between operative head 104 and at least a portion of vibratory drive mechanism 103. Spring 120 may be composed at least partially of a metal (e.g., chromium, molybdenum, etc.) and may compress in response to axial movement of actuator 116 in one direction (e.g., arrow T). More specifically, spring 120 may compress as actuator 116 pushes against vibrating assembly 102 to engage operative head 104 against axial sidewall 106 of blade 20. Thus, an equilibrium position of spring 120 can axially displace operative head 104 from blade 20. To disengage operative head 104 from blade 20, an operator may cease to apply axial force against vibrating assembly 102 and allow spring 120 to expand and axially retract operative head 104 from blade 20. Spring 120 can allow a user to immediately cease vibration and/or movement of blade 20 without applying a reverse axial force. It is understood that other currently-known or later-developed components for providing a reactive mechanical force may be substituted for spring 120 in other embodiments of apparatus 100.

Figure 8:
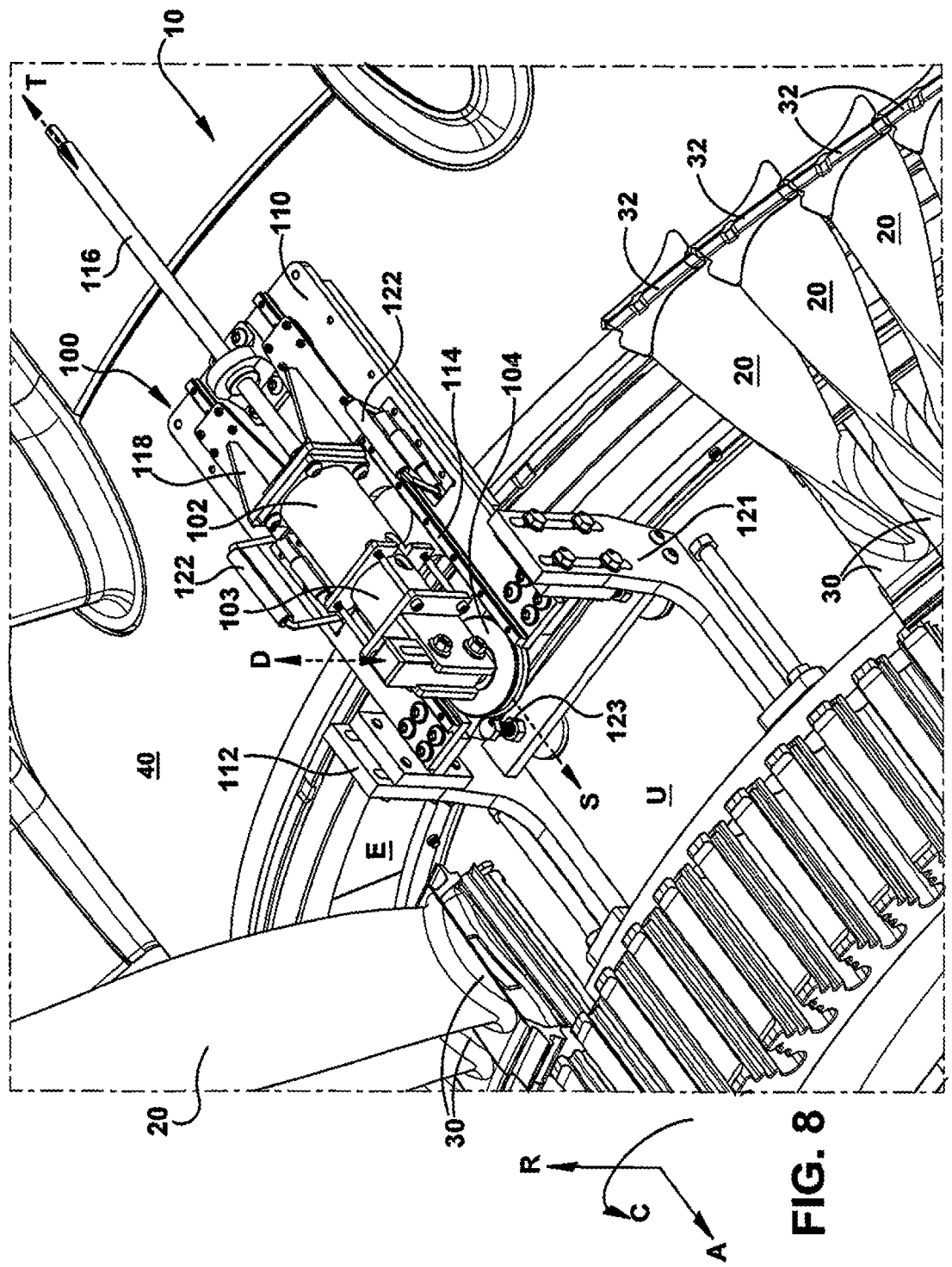
FIG. 8 is a perspective view of an apparatus for installing or removing a turbine blade according to further embodiments of the present disclosure.

Turning to FIG. 8, apparatus 100 is shown according to further embodiments of the present disclosure. Apparatus 100 and/or components thereof (e.g., mount 110) may be adapted to service blades 20 in other stages of turbomachine 10. In the example of FIG. 8, blades 20 may be mounted on rotor wheel 18 along a surface U positioned radially inward relative to diffusor barrel 40. In this case, apparatus 100 can include a frame 121 shaped to axially engage axial sidewall E of diffusor barrel 40 in addition to surface U of rotor wheel 18. As shown, frame 121 can include axially and radially extending sections to engage diffusor barrel 40 and rotor wheel 18. In addition, apparatus 100 can include a coupler 123 for mechanically attaching apparatus 100 to turbomachine 10 in a predetermined position. Coupler 123 may include, e.g., a bolt, a screw, a pin, and/or other components for mechanically engaging one component to another in a predetermined position. To engage operative head 104 with turbine blade root 30, operative head 104 may be slidably coupled to vibrating assembly 102 and/or other components of apparatus 100 to permit radial movement along the direction of reference arrow D.

Figure 9:
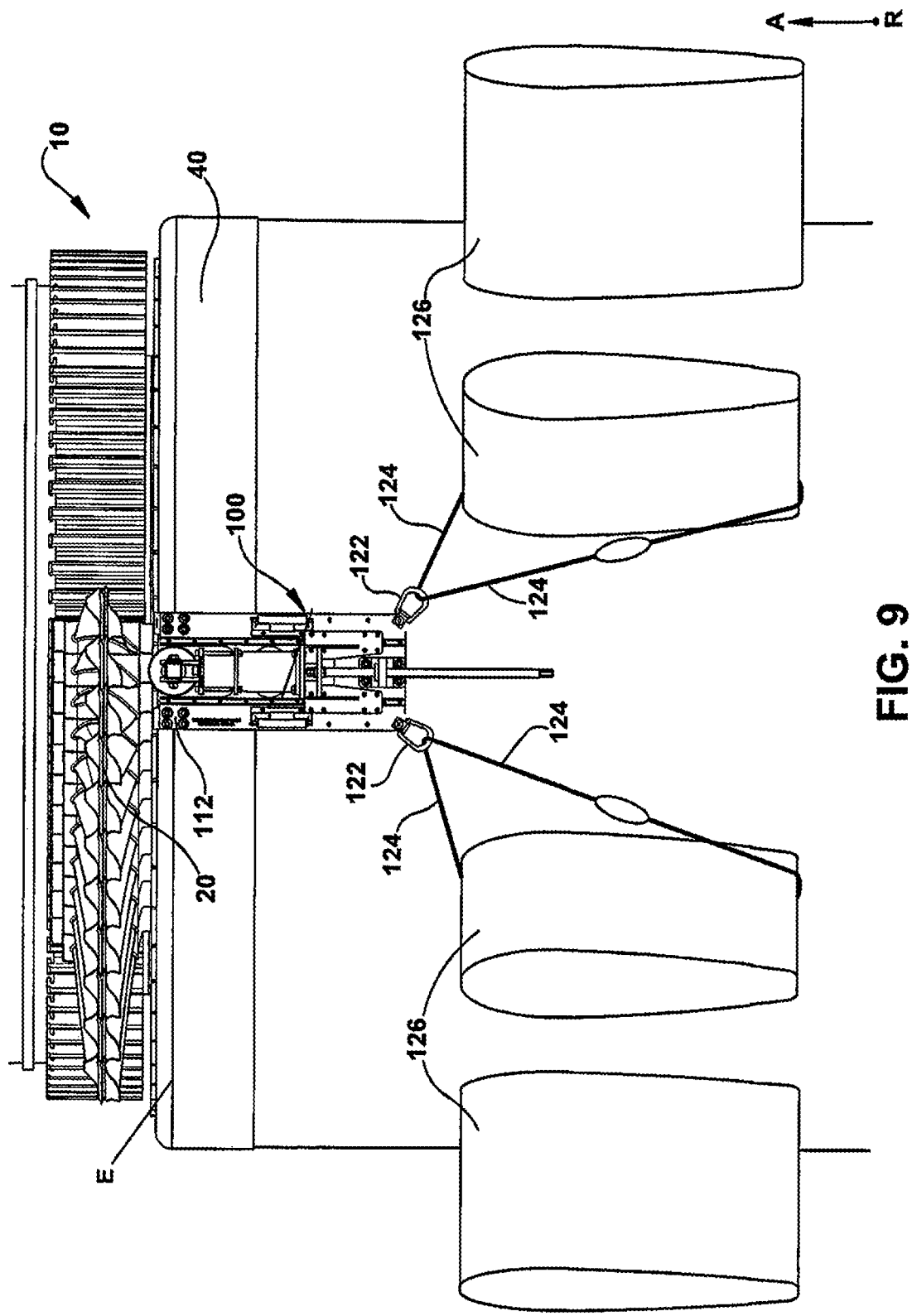
FIG. 9 is a plan view, with radial axis R extending out of the page, of an apparatus for installing and removing a turbine blade lashed to a turbomachine assembly according to embodiments of the present disclosure.

Referring to FIGS. 4 and 9 together, apparatus 100 may include additional features for fastening or otherwise mechanically coupling mount 110 to diffusor barrel 40. One or more lift members 122 may be positioned, e.g., at an axial end of mount 110, to engage a lash 124 (FIG. 9 only). Lift members 122 may be embodied, e.g., as eyelets, hooks, loops, and/or any other mechanical structure shaped to engage lash 124. Lashes 124 may be in the form of a cord, rope, and/or other instrument for tying one component to another. Lift members 122 may be embodied as loops extending outward from mount 110, and shaped to accommodate the cross-section of one or more lashes 124 for mechanically coupling apparatus 100 to portions diffusor barrel 40 and/or other components. Lift members 122 can be positioned on any desired portion of mount 110. In an example embodiment, lift members 122 can be at an end opposing axial end E of diffuser barrel 40. As shown in FIG. 9, each lash 124 can be mechanically coupled (e.g., tied, fastened, etc.) to a strut 126 of diffusor barrel 40 positioned upstream from blades 20. Tension in lashes 124 extending through lift members 122 of mount 110 can mechanically couple mount 110 to diffusor barrel 40. It is understood that lift members 122 and lashes 124 may be used and/or adapted to couple mount 110 and/or other portions of apparatus 100 to components other than diffusor barrel 40. Lift members 122 and lashes 124 can be used instead of or in addition to couplers 112 of mount 110.

Figure 10:
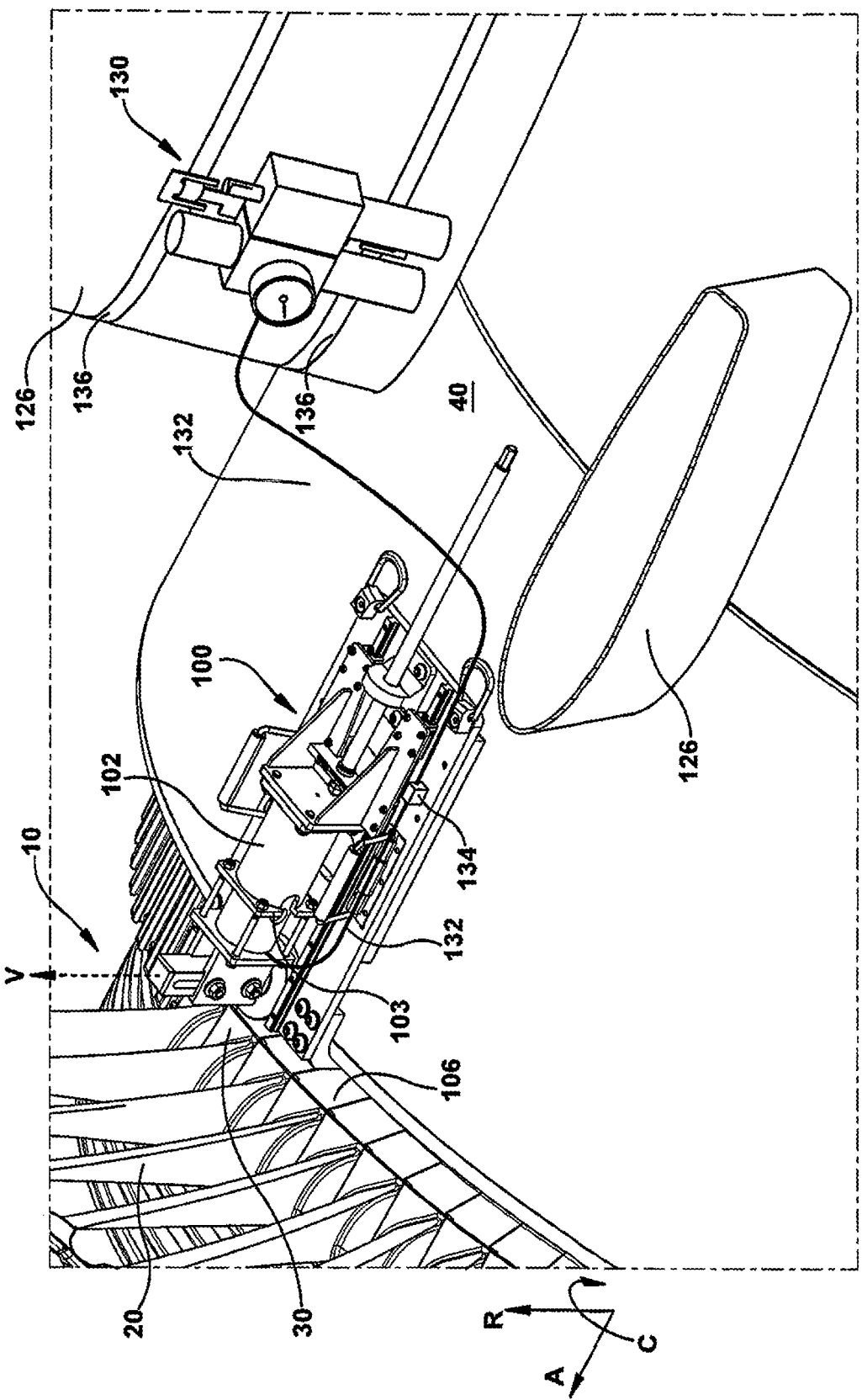
FIG. 10 is a perspective view of an apparatus for installing and removing a turbine blade coupled to a fluid source according to embodiments of the present disclosure.

Turning to FIG. 10, additional features of vibratory drive mechanism 103 in further embodiments of the disclosure are discussed. Vibratory drive mechanism 103 may, according to one example, include a pneumatic vibrator coupled to one or more fluid sources 130 through a fluid coupling 132, e.g., a flexible or rigid tube. Fluid source 130 may include a supply of compressed air and/or other gases operable to drive operative head 104 of vibrating assembly 102. The flow of compressed air from fluid source 130 to drive mechanism 103 through fluid coupling 132 can be turned on or off by the use of a valve 134 within fluid coupling 132. Where vibratory drive mechanism 103 includes, e.g., an electrical, pneumatic, and/or motor driven vibrating component, fluid source 130 and/or fluid coupling 132 can further include and/or be substituted for similar components such as batteries, cylinders, wired and/or wireless connections, etc.

Fluid source 130 may be coupled to one or more components of turbomachine 10 external to apparatus 100. Similar to lashes 124 (FIG. 9), fluid source(s) 130 may be removably coupled to strut(s) 126 of diffusor barrel 40, e.g., through adjustable length fasteners 136. Adjustable length fasteners 136 may include straps, cords, braces, etc., with adjustable lengths configured for attachment to struts 126 of varying size. When an operator moves apparatus 100 to another position on turbomachine 10, e.g., to install or remove other blades 20, fluid source(s) 130 can be adapted to accommodate changes in position. For example, fluid source(s) 130 and adjustable length fasteners 136 may be detached from respective strut(s) 126 and moved to other strut(s) positioned closer to the location of apparatus 100. Methods according to the present disclosure can thereby include fluidly coupling fluid source(s) 130 to vibrating assembly 102 before mechanically vibrating turbine blade base 30 with operative head 104.

Figure 11:
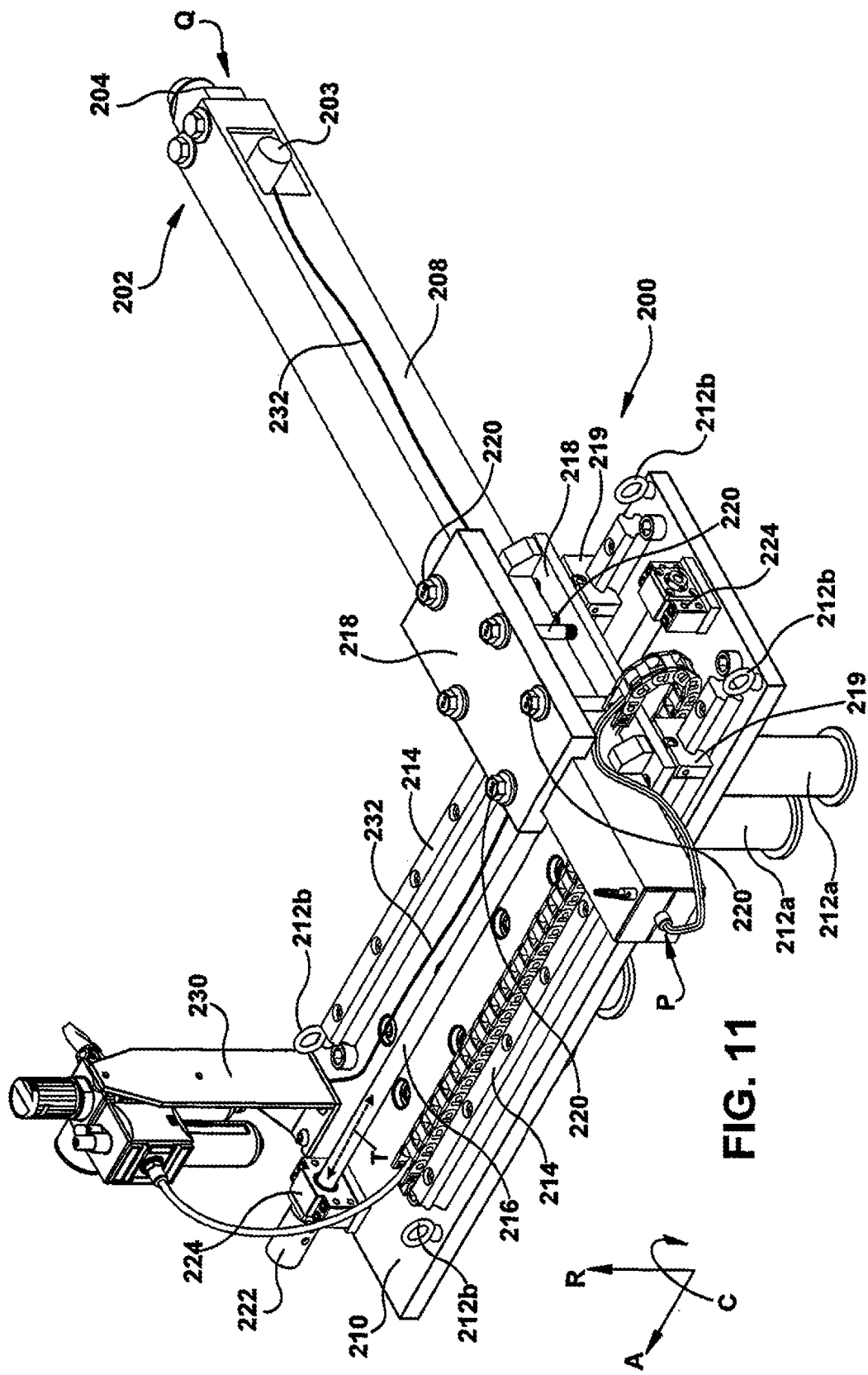
FIG. 11 is a perspective view of an apparatus for installing and removing a turbine blade according to further embodiments of the present disclosure.

Referring to FIG. 11, a servicing apparatus 200 (simply "apparatus" hereafter) for installing and removing blades 20 (FIGS. 1-10) according to further embodiments of the present disclosure is shown. Apparatus 200 can perform substantially the same operations as the various embodiments of apparatus 100 (FIGS. 4-10), and may include several optional distinctions and/or alternative features where discussed herein or otherwise applicable. It is also understood that the various features described relative to apparatus 100 may also be included in embodiments of apparatus 200, and vice versa. Apparatus 200 may include a vibrating assembly 202 with a corresponding vibratory drive mechanism 203. Vibratory drive mechanism 203 can include any of the example mechanical, pneumatic, electrical, combustion and/or hybrid drive mechanisms presented elsewhere herein as examples relative to vibratory drive mechanism 103 (FIGS. 4-7, 10). However embodied, vibratory drive mechanism 203 can impart mechanical vibrations against structures or components in contact with an operative head 204 of vibrating assembly 202. Operative head 204 can include any currently known or later-developed instrument for imparting an axial and circumferential force, e.g., a roller or other tool for providing axial and circumferential contact regions. In further embodiments, operative head 204 can mechanical vibration when driven by embodiments of vibratory drive mechanism 203, e.g., vibrating hammers, plates, cylinders, rollers, etc.

Embodiments of apparatus 200 may be particularly effective for situations where conventional tools for installing and removing blades 20 (FIGS. 1-10) are difficult to use near axially-mounted components of turbomachine 10 (FIGS. 1, 4-10). Vibrating assembly 202, when included with apparatus 200, can be housed within or otherwise mechanically coupled to an arm 208 oriented substantially radially relative to a machine being serviced (e.g., turbomachine 10). Arm 208 can include a single member, multiple member and can include one more materials including without limitation: metals, plastics, ceramics, and/or other materials adapted for use in the field of turbomachine installation or servicing. The orientation of arm 208 relative to components of turbomachine 10 is discussed elsewhere herein relative to other figures. Arm 208 can include a first end P slidably coupled to a mount 210 for apparatus 200, while a second end Q of arm 208 can be positioned proximal to vibrating assembly 202 or components thereof (e.g., operative head 204).

Mount 210 can include features for moving operative head 204 into and out of contact with blade(s) 20 (FIGS. 1-10), and for mechanically coupling apparatus 200 to portions of turbomachine 10 (FIGS. 1, 4-10). In particular, mount 210 of apparatus 200 can be shaped for placement on portions of turbomachine 10 (FIGS. 1, 4-10) and to permit limited movement of vibrating assembly 202 during operation. Mount 210 can include a group of couplers 212a, 212b in the form of, e.g., retaining couplers 212a and/or mount couplers 212b which may extend radially outward from mount 210 to static portions of turbomachine 10. Retaining couplers 212a may extend outward from a surface of mount 210 to engage one or more portions of a turbomachine component such as casing 50 (FIG. 3). Engagement between mount 210 and casing 50 through retaining couplers 212a is shown in other FIGS. and described elsewhere herein. In addition or alternatively, mount 210 can include mount couplers 212b which extend through the body of mount 210 to contact or otherwise engage portions of casing 50, as also described elsewhere herein.

Mount 210 may include one or more axial guides 214 to enable movement of vibrating assembly 202, operative head 204 and/or arm 208 relative to mount 210 in at least one direction, e.g., along line T. Axial guides 214 may be embodied as slidable couplings such as rails, raceways, slots, etc, and/or may include alternative forms of permitting movement in one direction such as gear bearings, rack-and-pinion assemblies, threaded housings, and/or other mechanical bearings. To effectuate movement of vibrating assembly 202, apparatus 200 can include an actuator 216 mechanically coupled to arm 208 (e.g., proximal to first end P), such that movement of actuator 216 causes arm 208 to move relative to axial guides 214. Rather than being coupled directly to axial guides 214, arm 208 may include a coupling member 218 which may be coupled to axial guides 214 directly or indirectly.

Where axial guides 214 are embodied as a rail or other slidable bearing, a pair of slidable couplings 219 may each be slidably connected to and/or mounted on respective axial guides 214. Slidable couplings 219 may take the form of trolleys, wheels, gears, and/or other sliding components or bearings designed to enable movement of one component relative to another, e.g., along the direction of arrow T. In alternative scenarios where axial guides 214 are in the form of a gear bearing or alternative component for providing a slidable coupling between two mechanically engaged elements, slidable couplings 219 may be substituted for, e.g., wheels, gears, threaded members, etc., for providing movement substantially in the direction of axial axis A. Coupling member 218 may be provided as a unitary housing shaped to engage an outer surface profile of arm 208, or alternatively may be coupled to one surface of arm 208. In this case, another coupling member 218 can be coupled to another surface of arm 208, with plate couplers 220 (e.g., bolts, screws, rivets, etc.) joining the two coupling members 218 together.

An operator may further control the position of arm 208 relative to mount 210 with additional components included within and/or operably connected to actuator 216. For example, an actuator drive mechanism 222 in the form of, e.g., a mechanical motor, electrical motor, etc., can produce and transmit mechanical work to actuator 216 to move arm 208 across axial guide(s) 214. Drive mechanism 222 can be coupled to actuator 216, e.g., through an end block 224 shaped to receive a portion of actuator 216 therein. End blocks 224 can be positioned at opposing ends of mount 210 to define linear ends of actuator 216 and/or define a direction in which actuator 216 operates. Each end block 224 can be mounted on a portion of mount 210, e.g., by being mechanically affixed thereto through conventional fasteners such as bolts, screws, rivets, etc.

Where vibrating assembly 202 is included with apparatus 200, and where as a pneumatic vibrator or other pressure-based system for imparting mechanical vibrations, apparatus 200 can include a pneumatic actuator 230 coupled to a surface of mount 210. Pneumatic actuator 230 can be embodied, e.g., as any currently-known or later-developed device for generating mechanical work by the use of pressurized fluids, e.g., compressed air. Thus, pneumatic actuator 230 may include a reservoir of pressurized gases therein to be routed to vibratory drive mechanism 203. In other embodiments, pneumatic actuator 230 may be fluidly coupled to a supply of pressurized fluids external to apparatus 200. A fluid coupling 232 can be positioned on or housed within mount 210 and arm 208, thereby providing a fluid connection between vibratory drive mechanism 203 and pneumatic actuator 230. The flow of fluids from pneumatic actuator 230 to vibratory drive mechanism 203 may be adjustable by way of valves, adjustable power sources, and/or other mechanical components capable of adjusting the flow of compressed fluids to selectively enable or disable the operation of vibratory drive mechanism 203. In embodiments where vibratory drive system 203 includes a purely or partially electrical system for driving operative head 204, pneumatic actuator 230 and fluid coupling 232 can be substituted for an electrical motor or other power source connected to vibratory drive system 203 through a wire. It is also understood that pneumatic actuator 230 may alternatively be mounted on and/or connected to arm 208 rather than being positioned on mount 210.

Figure 12:
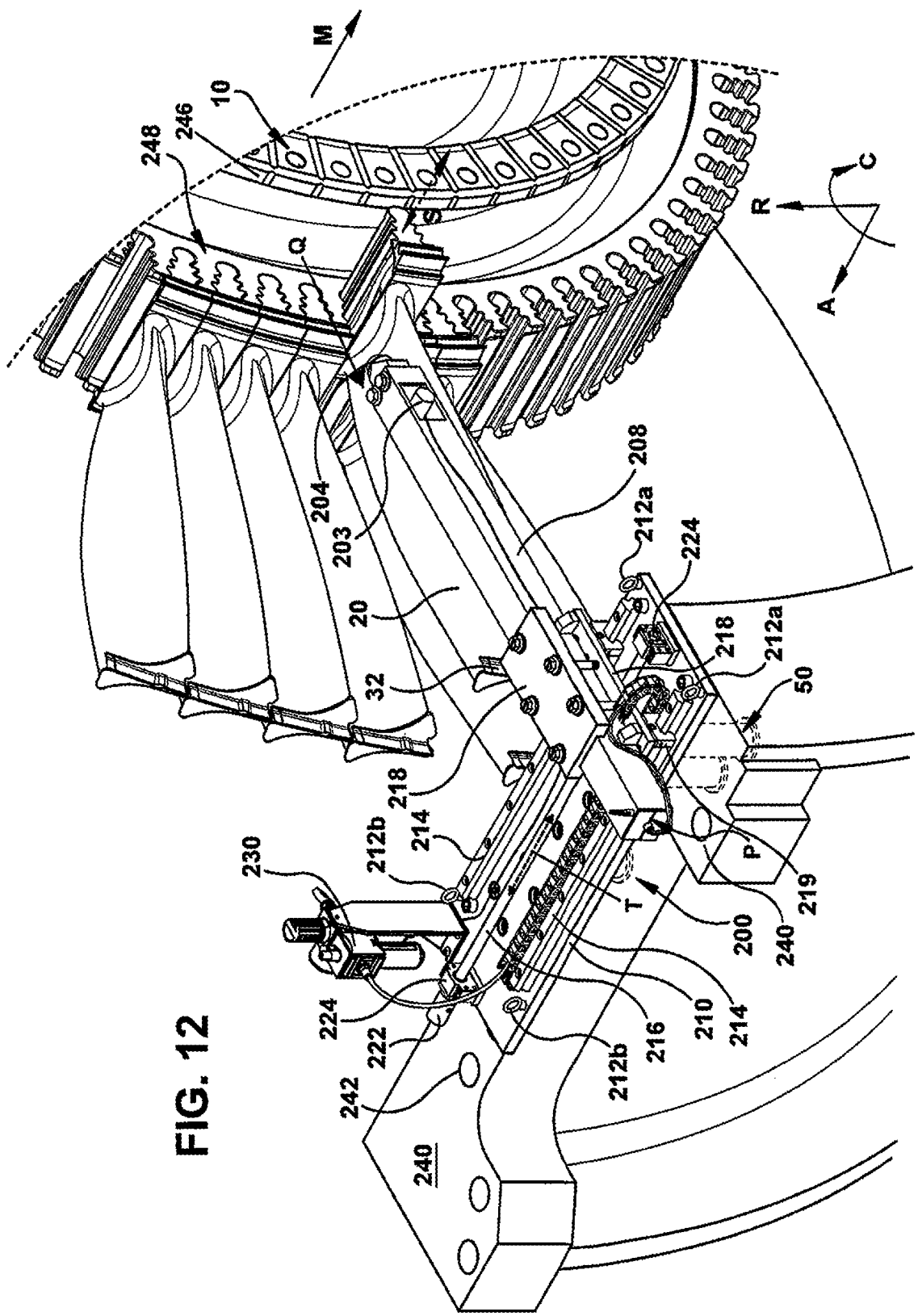
FIG. 12 is a perspective view of a turbomachine casing and apparatus for installing and removing a turbine blade according to embodiments of the present disclosure.
Figure 13:
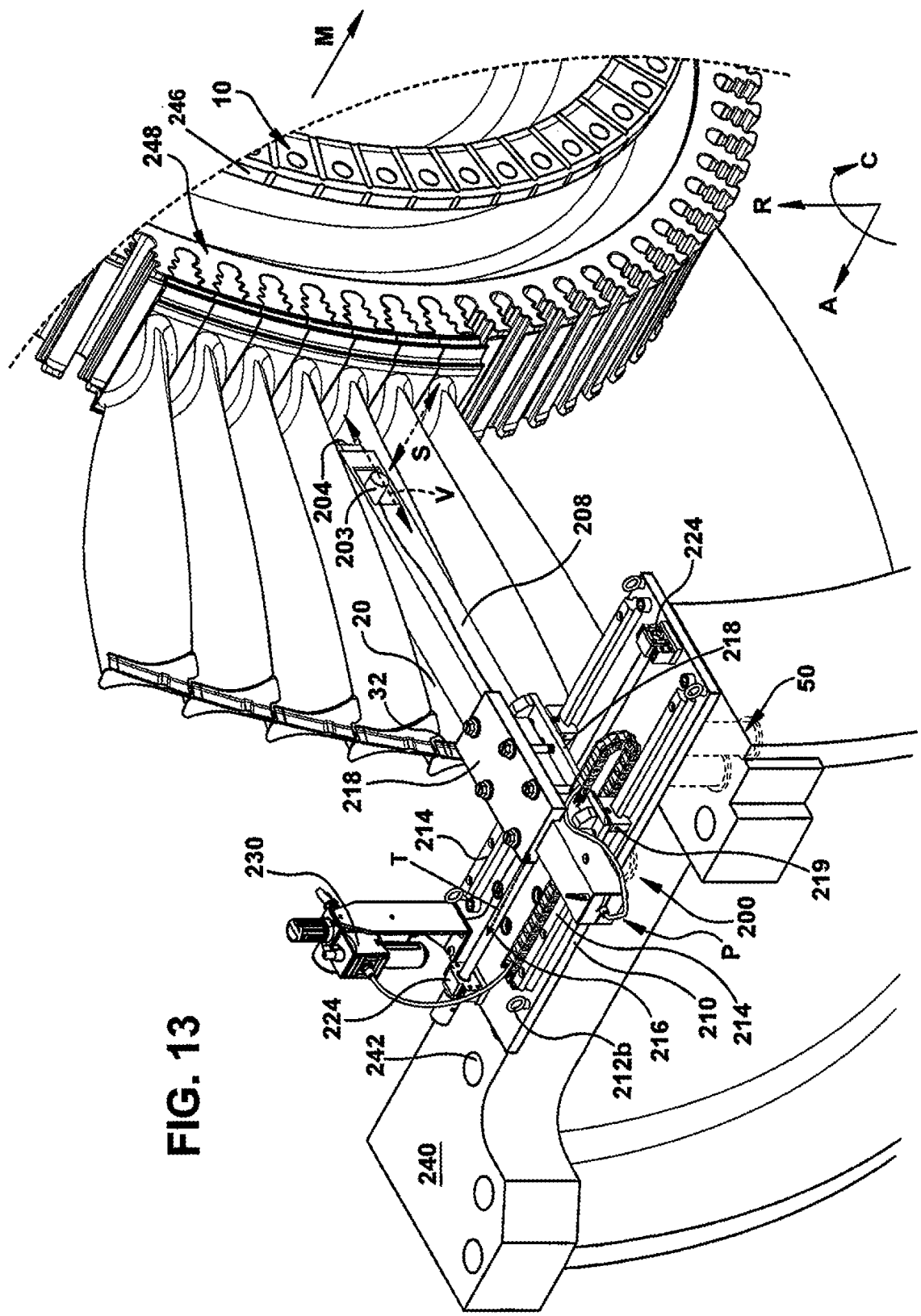
FIG. 13 is a cut-away perspective view of a turbomachine casing and apparatus for installing and removing a turbine blade according to embodiments of the present disclosure.

Turning to FIGS. 12 and 13, apparatus 200 is shown mounted on casing 50 to demonstrate methods of installing or removing blades 20 according to embodiments of the present disclosure. As shown, apparatus 200 can include mount 210 removably coupled to turbomachine casing 50 at an axially-extending surface 240 thereof, e.g., through coupler(s) 212a, 212b. According to some embodiments, mount couplers 212b can couple mount 210 to a connecting aperture 242 of casing 50, e.g., a hole shaped to receive a joint, fastener, pin, and/or other component therein. Connecting apertures 242 with couplers 212a, 212b therein are coupled are obscured from view in the accompanying FIGS. due to the size and structure of mount 210. Apparatus 200 can include arm 208 slidably coupled to mount 210 through axial guide(s) 214 at first end P, with second end Q of arm 208 being radially separated from mount 210. Arm 208 can extend substantially radially relative to an axial centerline axis M (FIG. 13 only) of turbomachine 10.

As discussed elsewhere herein, actuator 216 can adjust a position of arm 208 along axial guide 214, such that vibrating assembly 202 can move operative head 204 into and out of contact with blades 20 to be installed or removed. As discussed elsewhere herein, arm 208 can be moved to position operative head 204 proximal to axial sidewall 106 (FIG. 12 only) of turbine blade base 30 for installation or removal of blades 20. Where included, vibratory drive mechanism 203 can impart energy to operative head 204 to generate mechanical vibrations against blades 20 during operation. Similar to apparatus 100 (FIGS. 4-10), operative head 204 of vibrating assembly 202 can be embodied as a roller configured to rotate about an eccentric axis V (e.g., a substantially radial axis) relative to centerline axis M of turbomachine 10.

Vibrating assembly 202 of apparatus 200 may be operable to impart mechanical vibrations through operative head 204 as described elsewhere herein. As operative head 204 vibrates in response to inputs, e.g., from drive mechanism 203, arm 208 can move axially to install or remove blades 20 (e.g., last-stage blades) having shroud portions 32 with interlocking profiles 34 (FIG. 2) relative to adjacent blades 20. As shown in FIG. 12, the position of arm 208 may be adjusted as operative head 204 vibrates and as mount 210 remains stationary relative to casing 50. In particular, couplers 212a, 212b may couple mount 210 to casing 50 in a fixed position such that vibrating assembly 202 and arm 208 may be actuated relative to the fixed position of mount 210. More specifically, retaining couplers 212a and mount couplers 212b may couple mount 210 to casing 50 at axially-extending surface 240 thereof, such that rotor wheel 18 and/or blades 20 may be rotated about centerline axis M. Thus, methods of the present disclosure can include fastening mount 210 to casing 50 by inserting retaining coupler(s) 212a and/or mount coupler(s) 212b through mount 210 and horizontal joint hole(s) 242 of casing 50. During operation of apparatus 200, mount 210 may remain coupled to circumferential surface 242 of casing 50 while rotor wheel 18 (FIGS. 2-3, 5-6) is rotated to rotate blades 20, such that an operator may select individual blades 20 for installation or removal without changing the position of apparatus 200.

After apparatus 200 is fastened to casing 50 at mount 210, and a blade 20 to be removed or installed is chosen, operative head 204 may be substantially axially aligned with turbine blade base 30 of the selected blade 20. In the case of installation, blade 20 may not be positioned circumferentially between adjacent blades 20, and may be axially distal to rotor wheel 18 (FIGS. 2-3, 5-6). To install blade(s) 20, operative head 204 can contact blade 20 while imparting axial and circumferential force against blade 20. These actions can move blade 20 axially toward rotor wheel 18 such that blade 20 is installed between two other blades 20. In the case of removal, operative head 204 can contact and axially move blade 20 out of position between two adjacent blades 20, and out of rotor wheel 18. Whether blades 20 are being installed or removed, vibratory drive mechanism 203 can impart vibrations through operative head 204 while an operator of apparatus 200 axially moves arm 208 to engage operative head 204 with axial sidewall 106 of blade base 30. As mechanical vibrations and axially-directed force are imparted against blade 20, blade 20 may be moved into or out a corresponding slot in rotor wheel 18. Axial force may be applied by operative head 204 against blade 20 by movement of arm 208 through actuator 216. In addition, the present disclosure can include sliding vibrating assembly 202 relative to mount 210 to engage operative head 242 with blade base 30 before mechanically vibrating blade base 30.

Methods of installing and removing blade 20 may be particularly effective for installing or removing blades 20 which include shroud portion 32 configured to form an interlocking profile 34 (FIG. 2) with circumferentially adjacent blades 20. As shown best in FIG. 12, the use of arm 208 in apparatus 200 can allow a user to substantially align operative head 204 of vibrating assembly 202 with a rotor portion 244 of turbomachine 10 positioned between last-stage blades 20 and an upstream rotor wheel 246. As shown in FIG. 13, apparatus 200 may alternatively be used to install or remove blades 20 other than last-stage blades, e.g., at a location positioned axially between successive rotor wheels 246, 248. Apparatus 200 can thus be used at any position of turbomachine 10 where conventional installation or removal tools have difficulty accessing blades 20.

Embodiments of the present disclosure can provide several technical and commercial settings, some of which are discussed herein by way of example. Embodiments of the fixtures and methods discussed herein can provide substantially uniform manufacturing and/or servicing of turbine blades, such as those used in turbomachines. Embodiments of the present disclosure can also be employed for processes and/or events requiring at least partial disassembly of a turbomachine assembly and/or stage, such as during the inspection of particular components (e.g., last-stage blades of a gas turbine). The various embodiments discussed herein can be operable to install or remove blades in relatively inaccessible locations, without necessitating partial or total deconstruction of adjoining components. It is also understood that embodiments of the present disclosure can provide advantages and features in other operational and/or servicing contexts not addressed specifically herein.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for installation or removal of a turbine blade, the apparatus comprising:
   an operative head configured to engage an axial sidewall of a turbine blade base;
   a mount removably coupled to a portion of a turbomachine assembly by a coupler, wherein the operative head is slidably coupled to the mount such that the operative selectively engages the axial sidewall of the turbine blade base, and wherein the operative head is shaped to impart an axial and a circumferential force against the turbine blade base; and
   a vibrating assembly including a vibratory drive mechanism coupled to the operative head, such that a vibratory force is imparted though the operative head.

2. The apparatus of claim 1, wherein the operative head comprises a roller configured to rotate about an eccentric axis relative to the turbomachine assembly.

3. The apparatus of claim 1, wherein the operative head is further shaped to axially displace a turbine blade having an interlocking shroud profile.

4. The apparatus claim 1, further comprising:
at least one lift member coupled to the mount; and
a lash extending through the at least one lift member and coupled to the turbomachine assembly, such that the at least one lift member mechanically couples the mount to the turbomachine assembly through the lash.

5. The apparatus of claim 1, wherein the coupler comprises at least one hook configured to engage an axial sidewall of the turbomachine assembly.

6. The apparatus of claim 1, further comprising a spring axially coupled to the operative head, wherein the spring in an equilibrium position axially separates the operative head from the turbine blade base.

7. An apparatus for installation or removal of a turbine blade at a turbine blade base thereof, the apparatus comprising:
an operative head configured to engage an axial sidewall of the turbine blade base, wherein the operative head is shaped to impart an axial and a circumferential force against the turbine blade base;
an actuator configured to move the operative head into and out of engagement with the axial sidewall of the turbine blade base;
a vibrating assembly mechanically coupled to the operative head, such that a vibratory force is imparted though the operative head; and
a mount removably coupled to a portion of a turbomachine assembly by a coupler, wherein the actuator is slidably coupled to an exterior surface of the mount.

8. The apparatus of claim 7, further comprising a fluid coupling, wherein the vibrating assembly includes a vibratory drive mechanism coupled to a fluid source through the fluid coupling, wherein the fluid source is removably coupled to the turbo machine assembly.

9. The apparatus of claim 8, wherein the vibratory force axially moves the turbine blade into or out of contact with an interlocking shroud profile of an adjacent turbine blade.

10. The apparatus of claim 7, wherein an interior radial surface of the mount defines an axial plane, and wherein the operative head comprises a roller configured to rotate about a substantially radial axis relative to the turbomachine assembly, and within the axial plane of the lower surface of the mount.

11. The apparatus of claim 7, further comprising:
at least one lift member coupled to the mount; and
a lash extending through the at least one lift member and coupled to the turbomachine assembly, such that the at least one lift member mechanically couples the mount to the turbomachine assembly through the lash.

12. The apparatus of claim 7, further comprising a spring axially coupled to the operative head, wherein the spring in an equilibrium position axially separates the operative head from the turbine blade base.

13. The apparatus of claim 7, further comprising a pair of circumferentially spaced guide rails positioned on the mount and coupled to the actuator, wherein a circumferential separation distance between the circumferentially spaced guide rails is substantially equal to a circumferential length of the turbine blade base.

14. A method for installation or removal of a turbine blade, the method comprising:
fastening a mount of a servicing apparatus to a portion of a turbomachine assembly, such that an operative head of the servicing apparatus is substantially axially aligned with a turbine blade base of a turbine blade, and engages an axial sidewall of the turbine blade base, and wherein the operative head of the servicing apparatus is shaped to impart an axial and a circumferential force against the turbine blade base;
mechanically actuating the turbine blade base relative to the turbomachine by applying the axial force and the circumferential force against the turbine blade base through the operative head, such that the turbine blade transfers into or out of a rotor wheel;
coupling a vibrating assembly to the operative head of the servicing apparatus; and
mechanically vibrating the turbine blade base concurrently with applying the axial force and the circumferential force.

15. The method of claim 14, wherein the turbine blade includes a shroud portion having an interlocking shroud profile for circumferential engagement with adjacent turbine blades, and wherein the applying of the axial force and the circumferential force against the turbine blade base transfers the turbine blade into the rotor wheel between two circumferentially adjacent turbine blades.

16. The method of claim 14, wherein the turbine blade includes a shroud portion having an interlocking shroud profile for circumferential engagement with adjacent turbine blades, and wherein the applying of the axial force and the circumferential force against the turbine blade base transfers the turbine blade out of the rotor wheel and from being positioned between two circumferentially adjacent turbine blades.

17. The method of claim 14, further comprising sliding the operative head relative the mount to engage the operative head of the servicing apparatus with the turbine blade base, before mechanically actuating the turbine blade base.

18. The method of claim 14, wherein the turbomachine assembly comprises one of a diffuser barrel panel or a diffuser barrel strut of a turbomachine.

* * * * *